United States Patent
Agarwal et al.

(10) Patent No.: US 8,606,222 B2
(45) Date of Patent: Dec. 10, 2013

(54) METHODS, SYSTEMS, AND COMPUTER PROGRAM PRODUCTS FOR PERFORMING PREPAID ACCOUNT BALANCE SCREENING

(75) Inventors: Devesh Agarwal, Raleigh, NC (US); Cary Green, Raleigh, NC (US); Sergio Francisco Sanchez Casalongue, Apex, NC (US); Peter J. Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 1340 days.

(21) Appl. No.: 11/890,299

(22) Filed: Aug. 3, 2007

(65) Prior Publication Data

US 2008/0160954 A1 Jul. 3, 2008

Related U.S. Application Data

(60) Provisional application No. 60/877,540, filed on Dec. 28, 2006.

(51) Int. Cl.
*H04W 4/24* (2009.01)

(52) U.S. Cl.
USPC ........................................................ 455/405

(58) Field of Classification Search
USPC .............. 455/418, 432.3, 413, 405, 408, 466, 455/433, 406; 370/401, 466, 335; 379/114.01, 114.16, 114.2, 114.03; 705/44, 39, 26.1
See application file for complete search history.

(56) References Cited

U.S. PATENT DOCUMENTS

| | | |
|---|---|---|
| 3,917,915 A | 11/1975 | Karras |
| 4,162,377 A | 7/1979 | Mearns |

(Continued)

FOREIGN PATENT DOCUMENTS

| | | |
|---|---|---|
| CN | ZL 200780017383.1 | 11/2011 |
| EP | 0 088 639 | 9/1983 |

(Continued)

OTHER PUBLICATIONS

Notification of Transmittal of the International Search Report and the Written Opinion of the International Searching Authority, or the Declaration for International Application No. PCT/US07/26232 (May 15, 2008).

(Continued)

*Primary Examiner* — Kiet Doan
(74) *Attorney, Agent, or Firm* — Jenkins, Wilson, Taylor & Hunt, P.A.

(57) ABSTRACT

Methods, systems, and computer program products for performing prepaid account balance screening are disclosed. According to one aspect, the subject matter described herein includes a method for performing prepaid account balance screening. The method includes receiving, at a network entity for processing network signaling messages, a signaling message containing information that identifies a prepaid subscriber, the message being sent from a message source and intended for a message destination. It is determined whether the prepaid subscriber's account balance satisfies a threshold requirement, using prepaid account balance screening data and the information in the signaling message that identifies the prepaid subscriber, where the prepaid account balance screening data is a subset of available prepaid subscriber account information stored in a prepaid subscriber database separate from the prepaid account balance screening data. In response to determining that the prepaid subscriber's account balance does not satisfy the threshold requirement, a screening action is performed. In one example, the screening action shields the prepaid subscriber database from signaling message traffic associated with the prepaid subscriber's account.

44 Claims, 6 Drawing Sheets

(56) References Cited

U.S. PATENT DOCUMENTS

| | | |
|---|---|---|
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,680 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,799,073 A | 8/1998 | Fleischer, III et al. |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,915,222 A | 6/1999 | Olsson et al. |
| 5,949,871 A | 9/1999 | Kabay et al. |
| 5,995,822 A | 11/1999 | Smith et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,078,584 A | 6/2000 | Mottishaw et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,122,352 A | 9/2000 | Kangas et al. |
| 6,122,510 A | 9/2000 | Granberg |
| 6,128,304 A | 10/2000 | Gardell et al. |
| 6,128,377 A | 10/2000 | Sonnenberg |
| 6,134,307 A | 10/2000 | Broukman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,137,869 A | 10/2000 | Voit et al. |
| 6,138,007 A | 10/2000 | Bharatia |
| 6,138,023 A | 10/2000 | Agarwal et al. |
| 6,181,937 B1 | 1/2001 | Joensuu |
| 6,182,086 B1 | 1/2001 | Lomet et al. |
| 6,185,414 B1 | 2/2001 | Brunner et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,351,453 B1 | 2/2002 | Nolting et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,430,277 B1 | 8/2002 | Roadifer et al. |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,694,153 B1 | 2/2004 | Campbell et al. |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,963,583 B1 | 11/2005 | Foti |
| 6,968,052 B2 | 11/2005 | Wullert, II |
| 6,975,852 B1 | 12/2005 | Sofer et al. |
| 7,058,036 B1 | 6/2006 | Yu et al. |
| 7,181,194 B2 | 2/2007 | McCann et al. |
| 7,254,391 B2 | 8/2007 | McCann |
| 7,260,207 B2 | 8/2007 | Marsico |
| 7,310,415 B1 | 12/2007 | Short |
| 7,333,809 B2 * | 2/2008 | Engelhart ............... 455/432.3 |
| 7,346,022 B1 | 3/2008 | Roy |
| 7,466,807 B2 | 12/2008 | McCann et al. |
| 7,729,485 B2 | 6/2010 | Koskinen et al. |
| 7,764,947 B2 | 7/2010 | Koskinen et al. |
| 7,855,982 B2 | 12/2010 | Ramankutty et al. |
| 7,864,752 B2 | 1/2011 | Bennett et al. |
| 7,876,744 B2 | 1/2011 | Kwon |
| 7,936,866 B2 | 5/2011 | McCann |
| 8,139,735 B2 | 3/2012 | Cai et al. |
| 8,213,411 B2 | 7/2012 | Ayers et al. |
| 8,391,833 B2 | 3/2013 | Agarwal |
| 2001/0031641 A1 | 10/2001 | Ung et al. |
| 2001/0034224 A1 | 10/2001 | McDowell et al. |

(56) References Cited

U.S. PATENT DOCUMENTS

| | | | |
|---|---|---|---|
| 2002/0027983 A1 | 3/2002 | Suzuki | |
| 2002/0029189 A1 | 3/2002 | Titus et al. | |
| 2002/0058507 A1 | 5/2002 | Valentine et al. | |
| 2002/0071530 A1 | 6/2002 | Hannigan | |
| 2002/0110104 A1 | 8/2002 | Surdila et al. | |
| 2002/0111153 A1 | 8/2002 | Hartmaier et al. | |
| 2002/0150079 A1 | 10/2002 | Zabawskyj et al. | |
| 2003/0026289 A1 | 2/2003 | Mukherjee et al. | |
| 2003/0031160 A1 | 2/2003 | Gibson Ang et al. | |
| 2003/0037108 A1 | 2/2003 | Peiffer et al. | |
| 2003/0142803 A1 | 7/2003 | Freeman et al. | |
| 2003/0177281 A1 | 9/2003 | McQuillan et al. | |
| 2003/0190913 A1 | 10/2003 | Coad et al. | |
| 2003/0203740 A1 | 10/2003 | Bahl et al. | |
| 2003/0231623 A1 | 12/2003 | Ryu et al. | |
| 2004/0003037 A1 | 1/2004 | Fukimoto et al. | |
| 2004/0106393 A1 | 6/2004 | Chowdhury et al. | |
| 2004/0153506 A1 | 8/2004 | Ito et al. | |
| 2004/0166878 A1 | 8/2004 | Erskine et al. | |
| 2004/0176086 A1* | 9/2004 | Chatterjee et al. | 455/418 |
| 2004/0184594 A1 | 9/2004 | Schmechel et al. | |
| 2004/0203641 A1 | 10/2004 | Hazlewood | |
| 2004/0213393 A1 | 10/2004 | Bedingfiled et al. | |
| 2004/0233840 A1 | 11/2004 | Bye | |
| 2004/0240638 A1 | 12/2004 | Donovan | |
| 2005/0027867 A1 | 2/2005 | Mueller et al. | |
| 2005/0070310 A1 | 3/2005 | Caspi et al. | |
| 2005/0202836 A1 | 9/2005 | Schaedler et al. | |
| 2006/0020680 A1 | 1/2006 | Emberty et al. | |
| 2006/0025114 A1* | 2/2006 | Bales et al. | 455/413 |
| 2006/0050680 A1 | 3/2006 | Naim et al. | |
| 2006/0240819 A1 | 10/2006 | Xu et al. | |
| 2006/0252425 A1 | 11/2006 | Jiang | |
| 2006/0258329 A1 | 11/2006 | Gruchala et al. | |
| 2006/0291486 A1* | 12/2006 | Cai et al. | 370/401 |
| 2006/0291488 A1 | 12/2006 | Naqvi et al. | |
| 2007/0042779 A1 | 2/2007 | Eikkula | |
| 2007/0047539 A1 | 3/2007 | Agarwal et al. | |
| 2007/0127436 A1 | 6/2007 | Karimi-Cherkandi et al. | |
| 2007/0127647 A1 | 6/2007 | Russell | |
| 2007/0185809 A1 | 8/2007 | Duan | |
| 2007/0263565 A1 | 11/2007 | Roy | |
| 2009/0285225 A1 | 11/2009 | Dahod | |
| 2010/0184403 A1 | 7/2010 | Cai et al. | |
| 2010/0202446 A1 | 8/2010 | McCann et al. | |
| 2011/0003579 A1 | 1/2011 | Cai et al. | |
| 2011/0075675 A1 | 3/2011 | Koodli et al. | |
| 2011/0225309 A1 | 9/2011 | Riley et al. | |
| 2012/0034900 A1 | 2/2012 | Agarwal | |
| 2012/0099715 A1 | 4/2012 | Ravishankar et al. | |
| 2013/0017803 A1 | 1/2013 | Li et al. | |

FOREIGN PATENT DOCUMENTS

| | | |
|---|---|---|
| EP | 0 212 654 | 5/1987 |
| EP | 0 258 654 | 3/1988 |
| EP | 0 264 023 | 4/1988 |
| EP | 1 100 279 A2 | 5/2001 |
| EP | 1 107 617 A | 6/2001 |
| EP | 1 657 484 A1 | 5/2006 |
| EP | 1 425 932 B1 | 4/2009 |
| GB | 2382267 | 5/2003 |
| JP | 58-215164 | 12/1983 |
| JP | 62-200859 | 9/1987 |
| KR | 1020030025024 A | 3/2003 |
| KR | 10-2003-0066043 | 8/2003 |
| KR | 10-2006-0090378 | 8/2006 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 99/14910 | 3/1999 |
| WO | WO 00/16583 | 3/2000 |
| WO | WO 00/35155 A1 | 6/2000 |
| WO | WO 01/20920 | 3/2001 |
| WO | WO 01/22761 | 3/2001 |
| WO | WO 01/56308 A2 | 8/2001 |
| WO | WO 01/63883 | 8/2001 |
| WO | WO 02/052834 | 7/2002 |
| WO | WO 02/054786 A1 | 7/2002 |
| WO | WO 03/017697 | 2/2003 |
| WO | WO 03/103265 | 12/2003 |
| WO | WO 2005/033841 A2 | 4/2005 |
| WO | WO 2005/089119 A2 | 9/2005 |
| WO | WO 2006/031678 A2 | 3/2006 |
| WO | WO 2007/050589 A2 | 5/2007 |
| WO | WO 2007/106563 A2 | 9/2007 |
| WO | WO 2010/083509 A2 | 7/2010 |

OTHER PUBLICATIONS

Commonly-assigned, co-pending U.S. Appl. No. 11/724,590 for "Methods, Systems and Computer Program Products for Offloading Prepaid Status Queries from a Prepaid Status Database for Unlimited in-Network Prepaid Calls," (Unpublished, filed Mar. 13, 2007).

"Description of the SMS Prepaid Relay function implemented in the SRF equipment," edition 0.1, unpublished, dated Jul. 2001.

Notice of Allowance for Chinese Patent Application No. 200780017383.1 (Jun. 24, 2011).

Non-Final Official Action for U.S. Appl. No. 11/586,488 (Jul. 15, 2011).

Interview Summary for U.S. Appl. No. 11/586,488 (May 6, 2011).

Non-Final Official Action for U.S. Appl. No. 11/586,488 (Jan. 31, 2011).

Notification of Transmittal of the International Search Report and the Written Opinion of the International Searching Authority, or the Declaration for International Application No. PCT/US2010/021374 (Aug. 19, 2010).

Notification of Transmittal of the International Search Report and the Written Opinion of the International Searching Authority, or the Declaration for International Application No. PCT/US06/41449 (Jun. 20, 2007).

Non-Final Office Action for U.S. Appl. No. 13/277,626 (Feb. 27, 2013).

Extended European Search Report for European Application No. 07753190.3 (Feb. 22, 2013).

Non-Final Office Action for U.S. Appl. No. 13/048,629 (Feb. 15, 2013).

Second Office Action for Chinese Patent Application No. 200780051876.7 (Dec. 5, 2012).

Notice of Allowance and Fee(s) Due for U.S. Appl. No. 13/205,184 (Nov. 1, 2012).

3GPP, "Policy and Charging Control Over Rx Reference Point," 3GPP ETSI TS 29.214 version 8.3.0 Release 8 (Feb. 2009).

First Office Action for Chinese Patent Application No. 200780017383.1 (Dec. 31, 2010).

Communication of European Publication Number and Information on the Application of Article 67(3) EPC for European Patent No. 2116021 (Oct. 14, 2009).

Declaration of Gregory A. Hunt (Dec. 15, 2008).

Communication of European publication number and information on the application of Article 67(3) EPC for European Application No. 07753190.3 (Nov. 12, 2008).

Notification of Transmittal of the International Search Report and the Written Opinion of the International Searching Authority, or the Declaration for International Application No. PCT/US07/06543 (Aug. 29, 2008).

Notice of Allowance and Fee(s) Due for U.S. Appl. No. 11/724,590 (Aug. 14, 2008).

Communication pursuant to Article 94(3) EPC for European Application No. 02794890.0 (Mar. 18, 2008).

"BICC Architecture and BICC Protocol Details," Tekelec, pp. 28-41 (2008).

"BICC Signaling Router (BSR) Reference Architecture (WP005274)," Tekelec, pp. 2-91 (2008).

European Search Report for European Application No. 02794890.0 (Dec. 19, 2007).

(56) References Cited

OTHER PUBLICATIONS

"GPRS Tunneling Protocol (GTP)," Trillium, Continuous Computing, pp. 1-3 (Copyright 2007).
Notice of Allowance and Fee(s) Due for U.S. Appl. No. 10/218,402 (Aug. 25, 2006).
"Telecommunications and Internet Converged Services and Protocols for Advanced Networking (TISPAN); Interworking Between Session Initiation Protocol (SIP) and Bearer Independent Call Control (BICC) Protocol or ISDN User Part (ISUP)," ETSI EN 383 001 V1.1.1 (Jun. 2006).
Jennings et al., "Session Initiation Protocol (SIP) URIs for Application such as Voicemail and Interactive Voice Response (IVR)," The Internet Society, RFC 4458 (Apr. 2006).
Non-Final Official Action for U.S. Appl. No. 10/218,402 (Dec. 7, 2005).
"Gateway Control Protocol: Version 3," Series H: Audiovisual and Multimedia Systems; Infrastructure of Audiovisual Services—Communication Procedures, ITU-T H.248.1 (Sep. 2005).
Restriction Requirement for U.S. Appl. No. 10/218,402 (Feb. 23, 2005).
"Interworking Between Session Initiation Protocol (SIP) and Bearer Independent Call Control Protocol or ISDN User Part," ITU-T Q.1912.5, pp. 1-101 (Mar. 2004).
"Services and Protocols for Advanced Networks (SPAN); Bearer Independent Call Control (BICC) Capability Set 2 (CS2); Protocol Specification," ETSI EN 302 213 V1.1.2 (Jan. 2004).
"Telecommunications and Internet Protocol Harmonization Over Networks (TIPHON) Release 4; Technology Mapping; Implementation of TIPHON Architecture Using BICC," ETSI TS 102 228 V4.1.1 (Nov. 2003).
Camarillo et al., "Mapping of Integrated Services Digital Network (ISDN) User Part (ISUP) Overlap Signalling to the Session Initiation Protocol (SIP)," Network Working Group, RFC 3578 (Aug. 2003).
Notification of Transmittal of the International Search Report or the Declaration for International Application No. PCT/US02/25789 (Dec. 10, 2002).
"Series Q: Switching and Signalling; Broadband ISDN—Signalling ATM Adaptation Layer (SAAL); Signalling Transport converter on SCTP," ITU-T Q.2150.3 (Dec. 2002).
"Bearer Independent Call Bearer Control Protocol," ITU-T Q.1950, p. 1-96 (Dec. 2002).
Camarillo et al., "Integrated Services Digital Network (ISDN) User Part (ISUP) to Session Initiation Protocol (SIP) Mapping," Network Working Group, RFC 3398 (Dec. 2002).
Vemuri et al., "Session Initiation Protocol for Telephones (SIP-T): Context and Architectures," Network Working Group, RFC 3372 (Sep. 2002).
Chang, "BICC Extension of SIP in Inter-Network Configuration," Internet Engineering Task Force, draft-chang-sipping-bicc-network-00.txt, pp. 1-17 (Mar. 2002).
Multiservice Switching Forum, "Implementation Agreement for BICC," MSF-IA-BICC.001-FINAL (Feb. 2002).
Marshall et al., "SIP Extensions for Supporting Distributed Call State," SIP Working Group, Internet Draft, pp. 1-12 (Aug. 2001).
"Series Q: Switching and Signalling; Specification of Signalling Related to Bearer Independent Call Control (BICC); Bearer Independent Call Control Protocol (Capability Set 2): Basic Call Procedures," ITU-T Q.1902.4 (Jul. 2001).
"Bearer Independent Call Control Protocol (Capability Set 2) and Signalling System No. 7 ISDN User Part: Formats and Codes," ITU-T Q.1902.3, pp. 1-141 (Jul. 2001).
"Bearer Independent Call Control Protocol (Capability Set 2) and Signaling System No. 7 ISDN user part: General Functions of Messages and Parameters," ITU-T Q.1902.2 (Jul. 2001).
"Bearer Independent Call Control Protocol (Capability Set 2): Functional Description," ITU-T Q.1902.1, pp. 1-23 (Jul. 2001).
"Series Q: Switching and Signalling, Specification of Signalling Related to Bearer Independent Call Control (BICC); BICC Bearer Control Tunnelling Protocol," ITU-T Q.1990 (Jul. 2001).
"Series Q: Switching and Signalling; Specifications of Signalling System No. 7—ISDN User Part; Signalling System No. 7—Application Transport Mechanism: Bearer Independent Call Control (BICC); Amendment 1: Bearer Independent Call Control Capability Set 2," ITU-T Q.765.5 (Jul. 2001).
"Series Q: Switching and Signalling; Specifications of Signalling Related to Bearer Independent Call Control (BICC): Interworking Between Signalling System No. 7 ISDN User Part and the Bearer Independent Call Control Protocol," ITU-T Q.1912.1 (Jul. 2001).
"Series Q: Switching and Signalling; Interworking Between Selected Signalling Systems (PSTN Access, DSS1, C5, R1, R2, TUP) and the Bearer Independent Call Control Protocol," ITU-T Q.1912.2 (Jul. 2001).
"Signalling Transport Converter on MTP3 and MTP3b," ITU-T Q.2150.1 (May 2001).
"Generic Signalling Transport Service," ITU-T Q.2150.0 (May 2001).
"ITU-Q1970: Draft New ITU-T Recommendation Q.1970 BICC IP Bearer Control Protocol," Network Dictionary (2001).
"Gateway Control Protocol: Transport Over Stream Control Transmission Protocol (SCTP)," Series H: Audiovisual and Multimedia Systems; Infrastructure of Audiovisual Services—Communication Procedures, H.248.4 (Nov. 2000).
"Bearer Independent Call Control Protocol," ITU-T Q.1901 (Jun. 2000).
Sugano et al., "Presence Information Data Format for IMPP," Internet draft, draft-ietf-impp-pidf-01.text, Network Working Group, pp. 1-17, (Mar. 10, 2000).
"Signalling System No. 7—ISDN User Part Enhancements for the Support of Number Portability," ITU-T Q.769.1 (Dec. 1999).
"Signalling System No. 7—ISDN User Part Formats and Codes," ITU-T Q.763 (Dec. 1999).
"Signalling System No. 7—ISDN User Part General Functions of Messages and Signals," ITU-T Q.762 (Dec. 1999).
"Signalling System No. 7—ISDN User Part Functional Description," ITU-T Q.761 (Dec. 1999).
"Series Q: Switching and Signalling; Specifications of Signalling System No. 7—ISDN Supplementary Services; ISDN User Part Supplementary Services," ITU-T Q.730 (Dec. 1999).
Liao et al., "SS7-TCAP/IP Interworking," Internet Engineering Task Force, pp. 1-14 (Mar. 1999).
De Ment, "The Evolution of Signaling," NMS Communications, pp. 1-28 (Publication Date Unknown).
"Mobile Wireless Overview," Cisco IOS Mobile Wireless Configuration Guide, pp. MWC-1-MWC-8 (Publication Date Unknown).
Applicant-Initiated Interview Summary for U.S. Appl. No. 12/689,702 (Jun. 5, 2012).
Communication pursuant to Article 94(3) EPC for European Application No. 05 724 466.7 (Apr. 10, 2012).
First Office Action for Chinese Patent Application No. 200780051876.7 (Mar. 7, 2012).
Non-Final Official Action for U.S. Appl. No. 12/689,702 (Feb. 2, 2012).
Extended European Search Report for European Application No. 05724466.7 (Jun. 20, 2011).
Notice of Allowance and Fee(s) Due for U.S. Appl. No. 11/807,691 (Dec. 23, 2010).
"3rd Generation Partnership Project; Technical Specification Group Services and System Aspects; Telecommunication management; Charging management; Diameter charging applications (Release 9)," 3GPP TS 32.399 V9.4.0, pp. 1-148 (Jun. 2010).
"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).
Final Official Action for U.S. Appl. No. 11/807,691 (Dec. 7, 2009).
3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).
Non-Final Official Action for U.S. Appl. No. 11/807,691 (Apr. 2, 2009).
Final Official Action for U.S. Appl. No. 11/807,691 (Aug. 21, 2008).

(56) References Cited

OTHER PUBLICATIONS

Interview Summary for U.S. Appl. No. 11/807,691 (Apr. 11, 2008).
Non-Final Official Action for U.S. Appl. No. 11/807,691 (Dec. 21, 2007).
Notice of Allowance and Fee(s) Due for U.S. Appl. No. 11/070,940 (May 11, 2007).
Final Official Action for U.S. Appl. No. 11/070,940 (Mar. 9, 2007).
Notification of European publication number and Information on the application of Article 67(3) EPC for European Application No. 05724466.7 (Nov. 22, 2006).
Notification of Transmittal of the International Search Report and the Written Opinion of the International Searching Authority, or the Declaration in International Application No. PCT/US05/06926 (Oct. 11, 2006).
Non-Final Official Action for U.S. Appl. No. 11/070,940 (Jun. 20, 2006).
Hakala et al., "Diameter Credit-Control Application," Network Working Group RFC 4006, pp. 1-114 (Aug. 2005).
"Prepaid vs. Number Portability," Power Point presentation (publication date unknown; electronic file creation date Jul. 29, 2003).
De Ment, "The Evolution of Signaling," NMS Communications, p. 1-28 (Publication Date Unknown).
Extended European Search Report for European Application No. 07867984.2 (Jun. 18, 2013).

* cited by examiner

METHODS, SYSTEMS, AND COMPUTER PROGRAM PRODUCTS FOR PERFORMING PREPAID ACCOUNT BALANCE SCREENING

RELATED APPLICATIONS

The presently disclosed subject matter claims the benefit of U.S. Provisional Patent Application Ser. No. 60/877,540 filed Dec. 28, 2006; the disclosure of which is incorporated herein by reference in its entirety.

TECHNICAL FIELD

The subject matter described herein relates to providing prepaid network services. More particularly, the subject matter described herein relates to methods, systems, and computer program products for performing prepaid account balance screening.

BACKGROUND

With the increasing popularity of prepaid network services, such as prepaid mobile plans, in which a user of a mobile phone purchases a number of cell-phone minutes in advance, the network infrastructure required to support prepaid services must be enhanced to handle the increased traffic and processing requirements.

FIG. 1 is a block diagram illustrating a conventional system for telecommunications in which a large number of subscribers are prepaid subscribers. When a mobile subscriber makes a call, the call enters the core telecommunication network via a mobile switching center (MSC 100). If the mobile subscriber is a prepaid subscriber, MSC 100 must confirm that the subscriber's prepaid account has a sufficient balance before allowing the subscriber to access the network. To do this, MSC 100 typically queries a service control point (SCP) designated for handling prepaid queries and which may include the prepaid database itself. Such an SCP is herein referred to as a prepaid SCP, or PPSCP. In FIG. 1, MSC 100 sends a query to one of a bank of PPSCPs 102 through a signal transfer point (STP 104).

For example, MSC 100 may send an initial detection point (IDP) query to STP 104 (FIG. 1, message 1). STP 104 may forward the IDP query to the bank of PPSCPs 102 (FIG. 1, message 2), which may respond to the query with either a CONNECT message if the prepaid subscriber has a sufficient account balance or a CONTINUE message if the prepaid subscriber has an insufficient account balance (FIG. 1, message 3). STP 104 may then forward the response to MSC 100 (FIG. 1, message 4). MSC 100 may either allow or deny the prepaid subscriber access to the network, based on whether the response received from STP 104 was a CONNECT or CONTINUE message, respectively.

As the number of prepaid subscribers increases, the number of SCPs in the bank of PPSCPs 102 may increase, with a corresponding increase in the number of connections to the bank of PPSCPs 102. An increase in SCPs and connections required may drive up the costs of the system, not only in physical hardware but also in resources required to administer and maintain the additional nodes. In addition, the increase in traffic due to the increased number of queries to the prepaid database may cause overall network performance to suffer. For example, excessive network traffic caused by prepaid database queries may limit or impair the function of other nodes on the network, such as home location registers (HLRs), E.164 number mapping (ENUM) servers, home subscriber servers (HSSs), and the like.

Thus, there exists a need to minimize the number of PPSCPs required, and/or minimize the number of signaling links connecting the PPSCPs with the network or with each other. There also exists a need to reduce prepaid query traffic and the corresponding effect on network performance. Accordingly, there exists a need for methods, systems, and computer program products for performing prepaid account balance screening.

SUMMARY

According to one aspect, the subject matter described herein includes a method for performing prepaid account balance screening. The method includes receiving, at a network entity for processing network signaling messages, a signaling message containing information that identifies a prepaid subscriber, the message being sent from a message source and intended for a message destination. It is determined whether the prepaid subscriber's account balance satisfies a threshold requirement, using prepaid account balance screening data and the information in the signaling message that identifies the prepaid subscriber, where the prepaid account balance screening data is a subset of available prepaid subscriber account information stored in a prepaid subscriber database separate from the prepaid account balance screening data. In response to determining that the prepaid subscriber's account balance does not satisfy the threshold requirement, a screening action is performed. In one example, the screening action shields the prepaid subscriber database from signaling message traffic associated with the prepaid subscriber's account.

According to another aspect, the subject matter described herein includes a system for performing prepaid account balance screening. The system includes a prepaid subscriber account balance screening database, containing prepaid account balance screening data representing a subset of available prepaid subscriber account information stored in a prepaid subscriber database separate from the prepaid account balance screening data. The system also includes a network entity for routing and processing network signaling messages, where the network entity is adapted to receive a signaling message containing information that identifies a prepaid subscriber, the message being sent from a message source and intended for a message destination, and to use the information in the signaling message that identifies the prepaid subscriber to extract information from the prepaid subscriber account balance screening database to determine whether the prepaid subscriber's account balance satisfies a threshold requirement, and in response to determining that the prepaid subscriber's account balance does not satisfy the threshold requirement, perform a screening action. In one example, the screening action shields the prepaid subscriber database from signaling message traffic associated with the prepaid subscriber's account.

The subject matter described herein for methods, systems, and computer program products for performing prepaid account balance screening may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, methods, systems, and computer program products for performing prepaid account balance screening are provided. In one implementation, a message routing entity maintains a local database containing information that indicates whether or not a prepaid subscriber's account balance satisfies a threshold requirement. Upon determination that the account balance does not satisfy the threshold requirement, the routing entity may respond on behalf of a prepaid SCP, thus obviating the need for query/response messages to and from the prepaid SCP, resulting in a reduction of network traffic. For example, the message routing entity may check to see if the subscriber has a positive account balance, and if not (i.e., the subscriber's account balance is zero or negative) the message routing entity may respond with a "call not allowed" message on behalf of the prepaid SCP.

Figure 1:
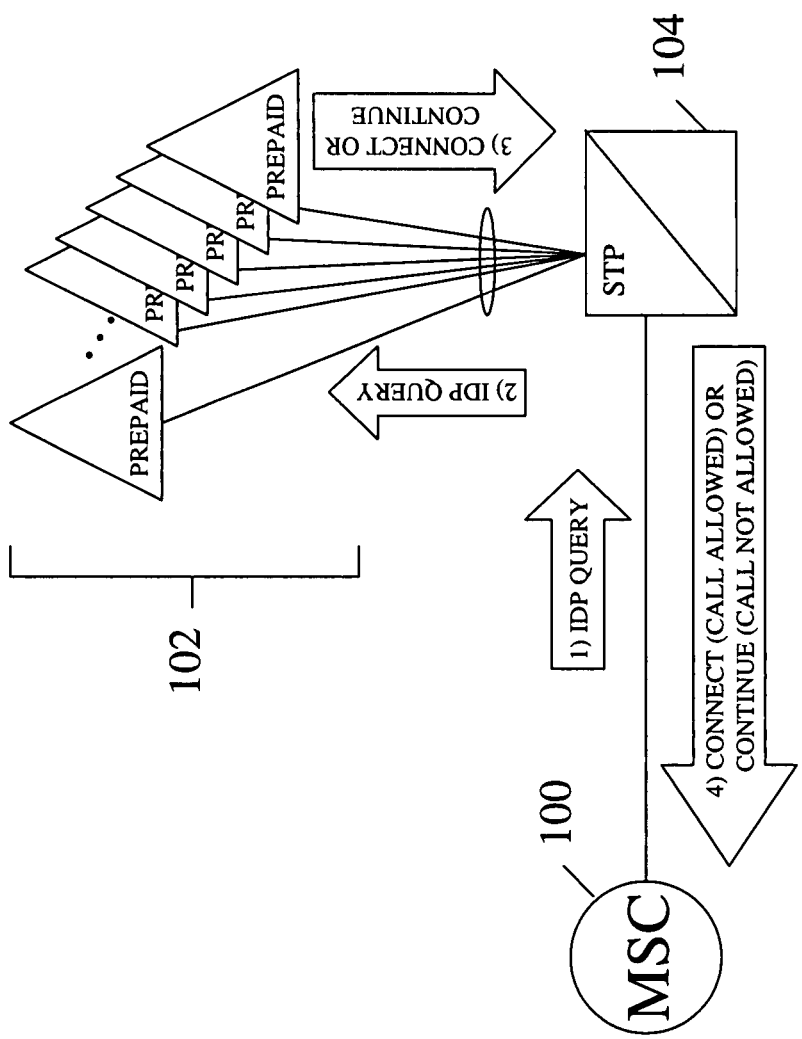
FIG. 1 is a block diagram illustrating a conventional system for telecommunications in which a large number of subscribers are prepaid subscribers.
Figure 2:
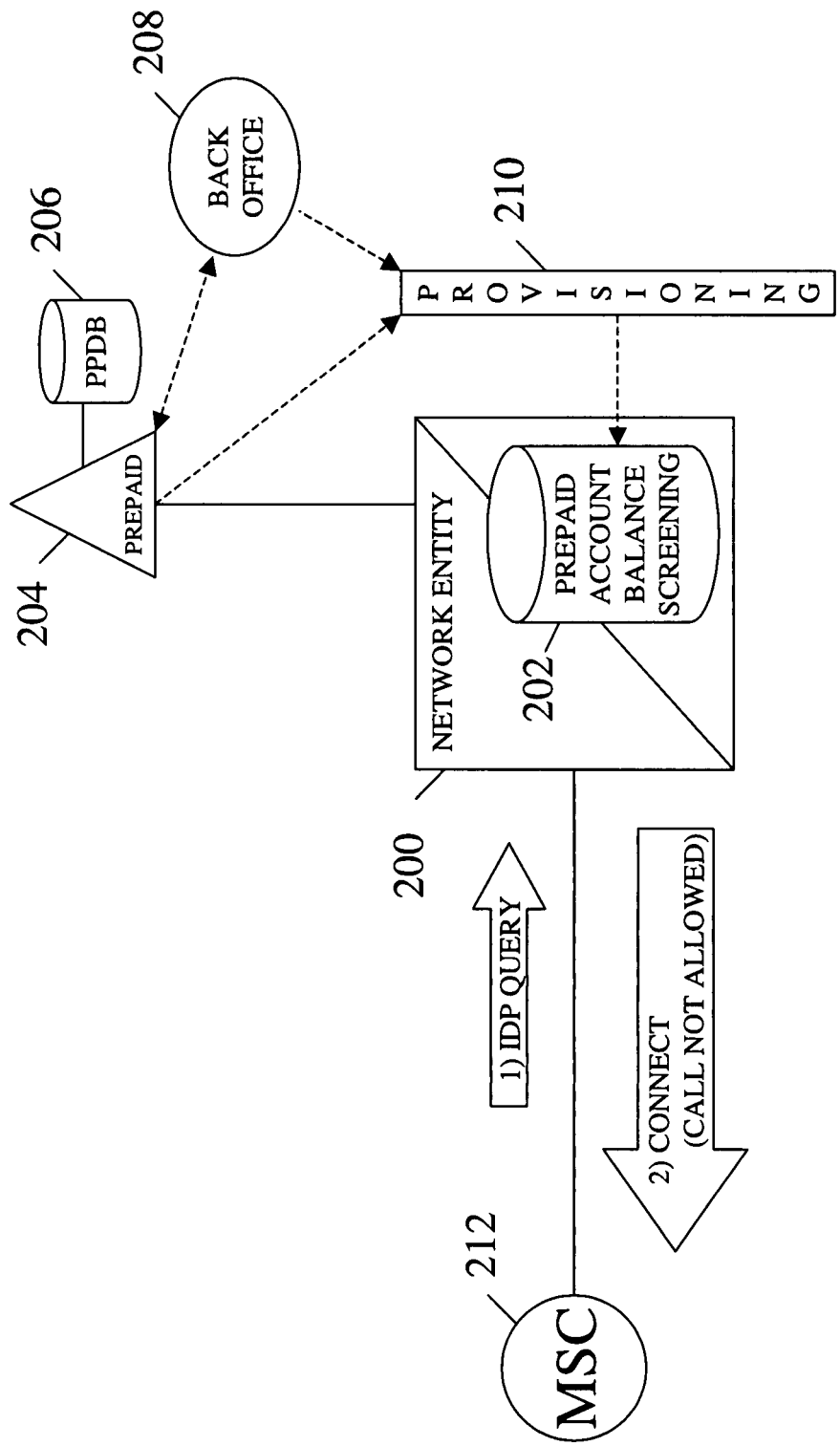
FIG. 2 illustrates an exemplary system for performing prepaid account balance screening in accordance with an embodiment of the subject matter described herein.

FIG. 2 illustrates an exemplary system for performing prepaid account balance screening in accordance with an embodiment of the subject matter described herein. The system includes a network entity NE 200 for routing and/or processing signaling messages. For example, NE 200 may be a signal transfer point (STP), a Signaling System 7 (SS7)/Internet protocol (IP) signaling gateway, a session initiation protocol (SIP) server, a media gateway controller (MGC) and softswitch (SS), a tandem office, or an IP Multimedia Subsystem (IMS) node, such as a subscriber location function (SLF). Exemplary signaling message protocols include SS7, Internet Engineering Task Force (IETF) SIGTRAN, SIP, bearer independent call control (BICC), Radius, Diameter, and mobile application part (MAP).

In one embodiment, a prepaid account balance screening database 202 is used for storing prepaid account balance screening data, i.e., information from which it can be determined whether a prepaid subscriber's account balance satisfies a threshold requirement. Prepaid account balance screening database 202 may be a component within NE 200, such as a database program running on a server or processor card within the telecommunication frame NE 200, or it may be a database external to NE 200 and associated with NE 200, such as a database located on a database server that is connected to NE 200 via a local bus or LAN. Prepaid account balance screening database 202 may also be available for access by other network entities, as well. It is understood that the prepaid account balance screening data may be stored and/or maintained in means other than a database, such as in a table, in a data structure in memory, and the like.

The system may contain a network entity adapted to provide a prepaid accounting service, such as a prepaid service control point (PPSCP 204), or a prepaid application service, such as an IMS or SIP application server, which receives queries to a prepaid subscriber database (PPDB 206). In one implementation, PPDB 206 may be a master database for storing information about prepaid subscriber accounts maintained by the network provider. Prepaid account balance screening database 202 is separate from PPDB 206 and may contain a subset of the data stored in PPDB 206.

The purpose of prepaid account balance screening database 202 is to allow a determination whether a prepaid subscriber's account balance meets a threshold requirement before allowing the subscriber to access the network, without having to make a query to PPDB 206. To perform this determination, it is not necessary to use all of the data typically contained in database PPDB 206; thus, in one embodiment, prepaid account balance screening database 202 may be populated with a subset of the data contained in PPDB 206. Alternatively, prepaid account balance screening database 202 may contain data that is derived from the data or a subset of the data contained in PPDB 206.

In one embodiment, prepaid account balance screening database 202 may store information usable to determine whether a prepaid subscriber's account balance satisfies the threshold requirement. For example, prepaid account balance screening database 202 may include only the identities prepaid subscribers whose accounts do not satisfy the threshold requirement, in which case a subscriber is allowed to complete the call only if the subscriber is listed in prepaid account balance screening database 202. In this example, prepaid account balance screening database 202 may function as a "white list", or list of allowed subscribers. The prepaid account balance screening database 202 need only contain information by which the subscriber or account may be identified, such as the subscriber name, telephone number, uniform resource identifier (URI), IP address, or other identifying information. Alternatively, prepaid account balance screening database 202 may include only those prepaid subscribers whose accounts do satisfy the threshold requirement, in which case a subscriber is allowed to complete the call only if the subscriber is not listed in prepaid account balance screening database 202. In this example, prepaid account balance screening database 202 may function as a "black list", or list of disallowed subscribers. For implementations in which the subscriber is allowed or denied access based on whether or not the subscriber's name exists in a list, prepaid account balance screening database 202 need not be a fully-featured database, but could be as simple as a table, a list, or even a hash table or associative array. Prepaid account balance screening database 202 may include other information, such as the actual balance available. Alternatively, prepaid account balance screening database 202 may contain information that is nowhere contained in PPDB 206 but is instead derived from data contained in PPDB 206. For example, each subscriber record in PPDB 206 may include the subscriber's name and telephone number, and the subscriber's current prepaid balance; in this scenario, each prepaid account balance screening database 202 record could include a field not found in PPDB 206, such as a Boolean value that is set to either "allow" or "deny", depending on whether the prepaid subscriber's account balance meets the threshold requirement.

The system may include a back office 208 through which a subscriber may perform subscriber account transactions, such as adding funds to the subscriber's prepaid account, determining the prepaid account balance, and so on. For example, back office 208 may process a payment, such as a credit card payment, from a subscriber; back office 208 may instruct PPSCP 204 to increase that subscriber's account balance, and PPSCP 204 may update that subscriber's account record within PPDB to reflect the new balance. This may trigger an update of prepaid account balance screening database 202 to reflect a change in a subscriber's account status or account balance. The update of prepaid account balance screening database 202 may be performed via a provisioning interface 210 or other means. For example, where the threshold requirement is that the subscriber's account balance must be greater than zero, if the subscriber's balance goes from zero or negative to a value greater than zero, back office 208, PPSCP 204, or some other entity may update prepaid account balance screening database 202 to change that subscriber's status to indicate that the subscriber's account balance satisfies the threshold requirement. Similarly, if a subscriber's account balance goes to zero, e.g., the subscriber consumes all of the subscriber's prepaid minutes, PPSCP 204 may, in addition to updating its own database PPDB 206, update that subscriber's status in prepaid account balance screening database 202. Alternatively, PPSCP 204 may inform back office 208 that the subscriber has a zero or negative balance, and back office 208 may use provisioning interface 210 to update prepaid account balance screening database 202 to indicate that the subscriber's account balance does not satisfy the threshold requirement. Other examples of threshold requirements include: allowing a call only if the subscriber's account balance is above a certain positive number, such as the minimum price of a call, for example; allowing a call only if the subscriber's account balance is above a certain negative number, which essentially extends only a certain amount of credit to a subscriber; or other decisions that may be based at least in part on a subscriber's pre-paid account balance.

An example of prepaid account balance screening is now explained with reference to FIG. 2, in which NE 200 receives an initial detection point (IDP) query that is sent from a mobile switching center (MSC 212) (FIG. 2, message 1). Rather than forwarding the message to PPSCP 204, which would in response forward the query to PPDB 206, NE 200 detects whether the IDP query contains the identity of a prepaid subscriber, and if so, queries prepaid account balance screening database 202 to determine whether the prepaid subscriber's account balance satisfies a threshold requirement, such as a requirement that the prepaid subscriber have a balance greater than zero. If the subscriber's account balance does not meet the threshold requirement (e.g., the subscriber has a zero account balance), NE 200 will perform an action that shields the PPDB 206 from signaling message traffic associated with the prepaid subscriber's account. For example, NE 200 may respond on behalf of the message destination, PPSCP 204, by sending a CONNECT message to MSC 212 to indicate that the call is not allowed (FIG. 2, message 2). In this scenario, NE 200 is also responding on behalf of the prepaid subscriber database PPDB 206, since the message destination, PPSCP 204, would otherwise ultimately forward the prepaid query to PPDB 206 and convey PPDB 206's response back to MSC 212.

In this manner NE 200 avoids the unnecessary traffic of an IDP query and response to and from PPSCP 204/PPDB 206.

Figure 3:
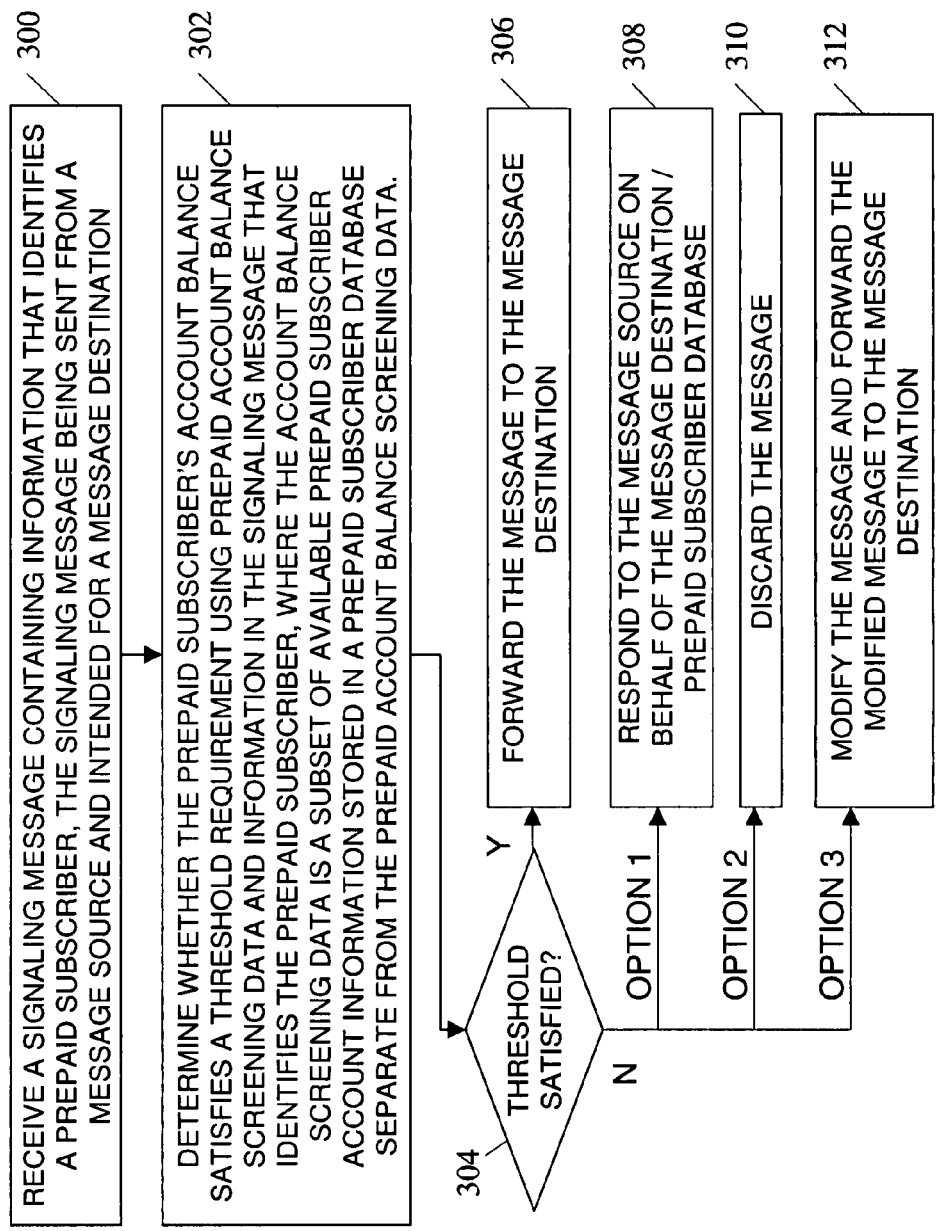
FIG. 3 is a flow chart illustrating an exemplary process for performing prepaid account balance screening in accordance with an embodiment of the subject matter described herein.

FIG. 3 is a flow chart illustrating an exemplary process for performing prepaid account balance screening in accordance with an embodiment of the subject matter described herein. This flow chart is explained in reference to FIGS. 2 and 3.

At block 300, a message containing information that identifies a prepaid subscriber is sent from a message source, such as MSC 212, and received by a network entity for processing network signaling messages, such as NE 200. The information identifying a prepaid subscriber may be a communications service subscriber identifier, such as a uniform resource identifier (URI), and/or any other information by which a prepaid subscriber may be identified, such as an international mobile subscriber identity (IMSI) number, a mobile station integrated services digital network (MSISDN) number, etc.

The message may be directly associated with a prepaid service; for example, the message may be a query to a prepaid service application, such as PPSCP 204. Alternatively, the message may be indirectly associated with a prepaid service; for example, the message may be to a service which itself may make a query to a prepaid service application. Alternatively, the message may invoke a service which should not be allowed unless the prepaid subscriber has a sufficient balance. Example messages indirectly associated with a prepaid service include queries to a mobile services node, such as an HLR and/or HSS, queries to a short message service node, such as a short message service center (SMSC), and response messages from a network service, such as an E.164 number mapping (ENUM) service or a domain name system (DNS) service.

The message may be sent to NE 200 but intended for a message destination other than NE 200. For example, NE 200 may receive a message that is sent route on global title (GT) or route on point code/subsystem number (PC/SSN), in which case NE 200 will determine the address of the intended message destination and route the message appropriately.

At block 302, a threshold query is performed for the identified prepaid subscriber, to determine whether or not that subscriber's account balance satisfies a threshold requirement. For example, NE 200 may query prepaid account balance screening database 202 to determine whether the prepaid subscriber has a zero balance. If the message contains information identifying more than one prepaid subscriber, NE 200 may query prepaid account balance screening database 202 for information about each identified subscriber.

At block 304, if the subscriber's account balance does not satisfy the threshold requirement, the process moves to block 306, in which NE 200 may forward the message to the message's intended destination. However, if at block 304 NE 200 determines that the subscriber's account balance satisfies the threshold requirement, NE 200 may take an appropriate action to shield PPDB 206 from query traffic relating to the prepaid subscriber's account, based upon the type of message received. For example, NE 200 may respond to the message on behalf of the message destination instead of sending it to the message destination (option 1, block 308); NE 200 may discard the message instead of sending it to the message destination (option 2, block 310); or NE 200 may modify the message and forward the modified message to the message destination (option 3, block 312). In all cases, if the prepaid subscriber's account balance satisfies the threshold requirement, the message received by NE 200 is forwarded to the message's destination (block 306). If, in block 300, the message received contains information that identifies additional prepaid subscribers (e.g., the message contains information that identifies more than one prepaid subscriber), blocks 302 through 312 may be repeated for each identified subscriber in turn.

Figure 4:
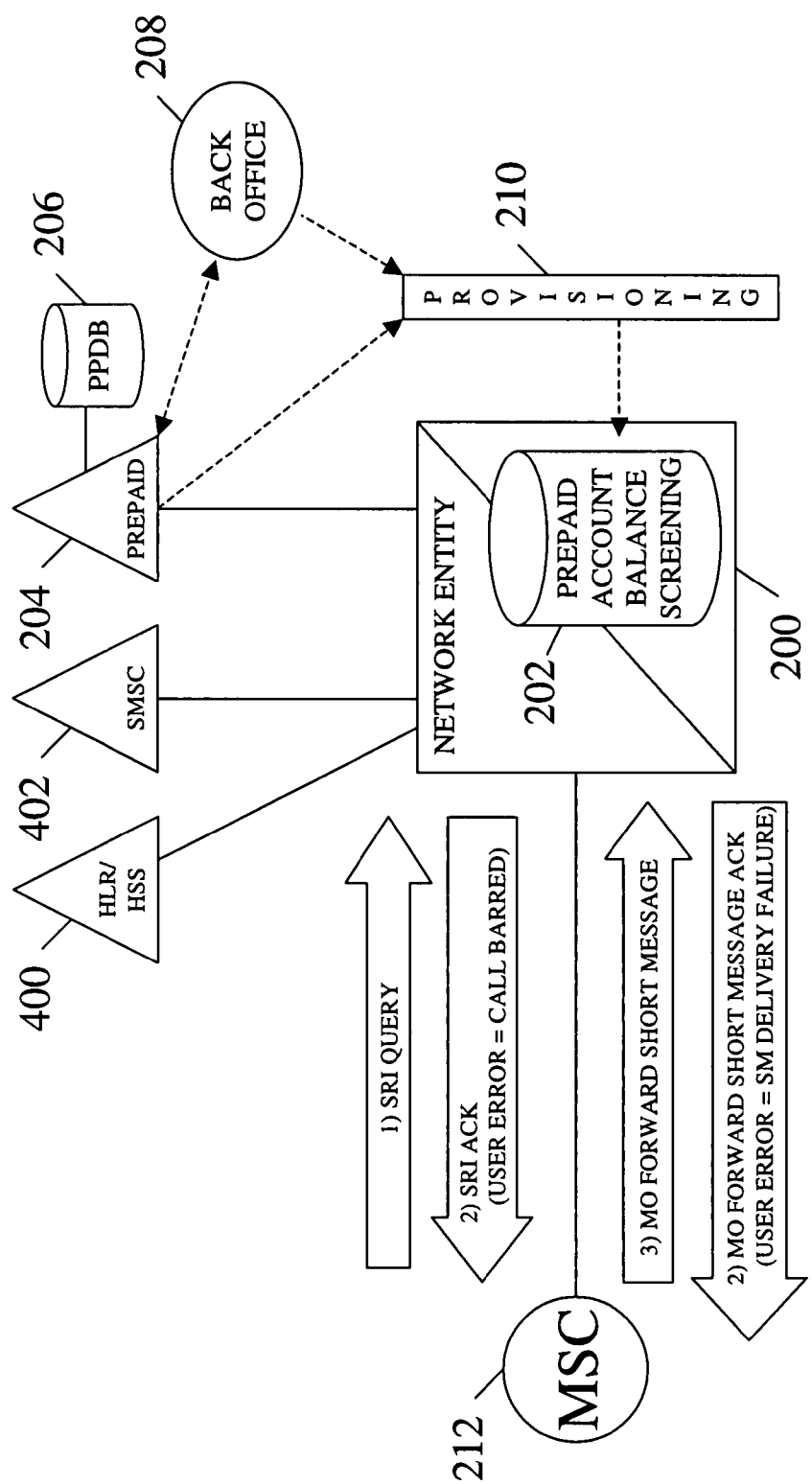
FIG. 4 is a block diagram illustrating an exemplary system for performing prepaid account balance screening in accordance with another embodiment of the subject matter described herein.

FIG. 4 is a block diagram illustrating an exemplary system for performing prepaid account balance screening in accordance with another embodiment of the subject matter described herein. In FIG. 4, the system is substantially identical to the system illustrated in FIG. 2, except for the inclusion of two additional nodes, a home location register/home subscriber server (HLR/HSS 400) and a short message service center (SMSC 402). An exemplary process for performing prepaid account balance screening in accordance with another embodiment of the subject matter described herein will be described with reference to FIGS. 3 and 4.

In FIG. 4, MSC 212 sends a mobile application part (MAP) send routing information (SRI) query message to NE 200 (FIG. 4, message 1, and FIG. 3, block 300). In one embodiment, the message may be sent as route on GT or route on PC/SSN; the SRI message is destined for whichever HLR or HSSis associated with a called mobile subscriber. NE 200 determines that the intended destination is HLR/HSS 400. In an alternative embodiment, the message may sent to HLR/HSS 400 directly, but is routed through NE 200.

NE 200 identifies a prepaid subscriber based on information contained in the message (FIG. 3, block 302), and performs a threshold query to prepaid account balance screening database 202 (FIG. 3, block 304). If a prepaid subscriber's account balance does not satisfy the threshold requirement, NE 200 responds to MSC 212 on behalf of HLR/HSS 400 (FIG. 3, option 1, block 308). For example, NE 200 may send to MSC 212 a message, such as a negative acknowledgement, that effectively terminates the attempted call by preventing the calling party from determining how to route the call to the called party (FIG. 4, message 2).

In this manner, the prepaid account balance screening shields both PPSCP 204 and HLR/HSS 400 from signaling message traffic associated with the prepaid subscriber's account.

Another exemplary process for performing prepaid account balance screening in accordance with another embodiment of the subject matter described herein will now also be described with reference to FIGS. 3 and 4.

In FIG. 4, MSC 212 sends a messaging service message, such as a GSM MAP message as route on point code/subsystem number to NE 200. For example, MSC 212 may send a mobile-originated ForwardShortMessage (MO FSM) message to NE 200 (FIG. 4, message 3). The MO FSM message is destined for whichever SMSC is associated with a called mobile subscriber. NE 200 receives the message (FIG. 3, block 300) and determines that the intended destination is SMSC 402. NE 200 identifies a prepaid subscriber based on information contained in the message (FIG. 3, block 302), and performs a threshold query to prepaid account balance screening database 202 (FIG. 3, block 304). If a prepaid subscriber's account balance does not satisfy the threshold requirement, NE 200 responds to MSC 212 on behalf of SMSC 402 (FIG. 3, option 1, block 308). For example, NE 200 may send to MSC 212 a message, such as a negative acknowledgement, to indicate the MO FSM could not be delivered. (FIG. 4, message 4).

In this manner, the prepaid account balance screening shields both PPSCP 204 and SMSC 402 from signaling message traffic associated with the prepaid subscriber's account.

Figure 5:
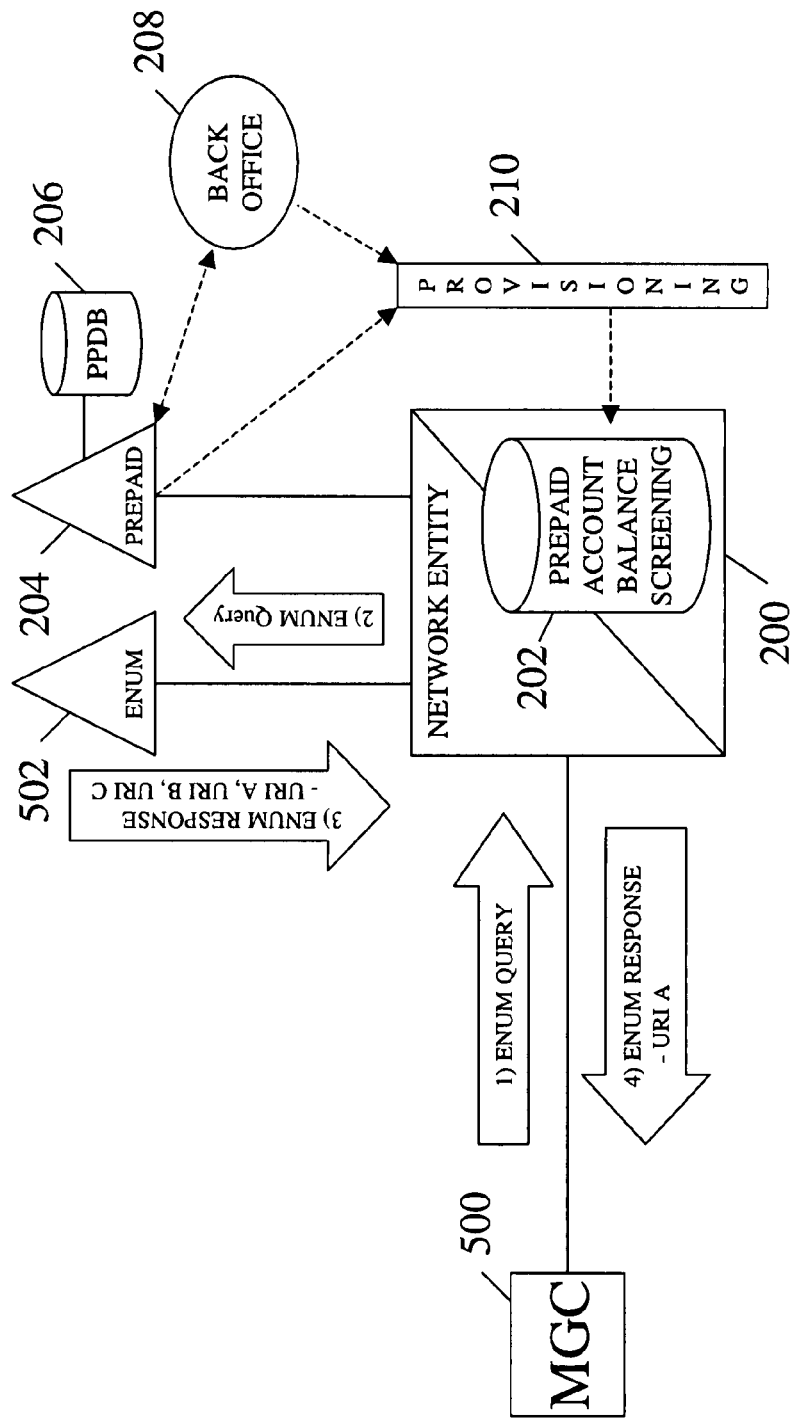
FIG. 5 is a block diagram illustrating an exemplary system for performing prepaid account balance screening in accordance with yet another embodiment of the subject matter described herein.

FIG. 5 is a block diagram illustrating an exemplary system for performing prepaid account balance screening in accordance with yet another embodiment of the subject matter described herein. The functions of NE 200, prepaid account balance screening database 202, PPSCP 204, PPDB 206, back office 208, and provisioning interface 210 are the same as described for FIG. 2, the descriptions of which will not be repeated here. In FIG. 5, the system includes a media gateway controller (MGC 500) and an E.164 number mapping server (ENUM 502). An exemplary process for performing prepaid account balance screening in accordance with another embodiment of the subject matter described herein will be described with reference to FIGS. 3 and 5.

In FIG. 5, MGC 500 sends an ENUM query through NE 200 (FIG. 5, message 1) to ENUM 502 (FIG. 5, message 2). ENUM 502 may then send a response (FIG. 5, message 3) through NE 200 to MGC 500. In this case, NE 200 may receive an ENUM response, destined for MGC 500, containing one or more URIs identifying prepaid subscribers. NE 200 receives the ENUM response (FIG. 3, block 300), identifies one or more prepaid subscribers based on information contained in the message (FIG. 3, block 302), and performs a threshold query (FIG. 3, block 304) for each prepaid subscriber identified. NE 200 may simply remove from the ENUM response the URIs of any prepaid subscribers that have an account balance that does not satisfy the threshold requirement (FIG. 3, option 3, block 312), and forward the modified ENUM response to its intended destination, MGC 500 (FIG. 5, message 4).

In this manner, the prepaid account balance screening filters out extraneous URI values—i.e., values associated with the prepaid subscriber's account—from the ENUM response message that is provided to the ENUM query originator, thereby reducing the processing burden on the querying node, which in this case is MGC 500.

Figure 6:
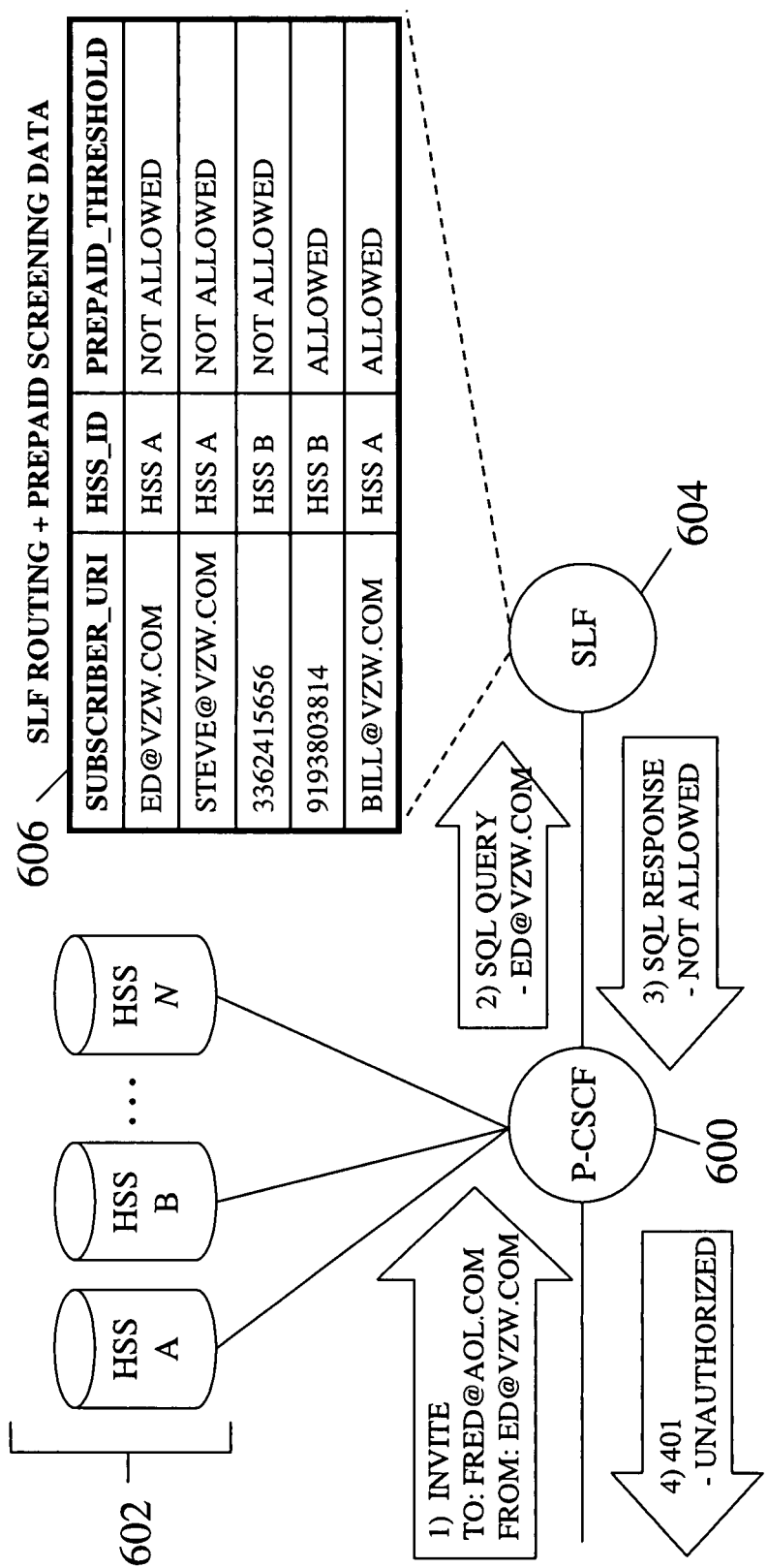
FIG. 6 is a block diagram illustrating an exemplary system for performing prepaid account balance screening in conjunction with performing a subscriber location function (SLF) in accordance with yet another embodiment of the subject matter described herein.

FIG. 6 is a block diagram illustrating an exemplary system for performing prepaid account balance screening in conjunction with performing a subscriber location function (SLF) in accordance with yet another embodiment of the subject matter described herein. An exemplary process for performing prepaid account balance screening in accordance with another embodiment of the subject matter described herein will be described with reference to FIGS. 3 and 6.

In FIG. 6, an exemplary IMS network includes a interrogating call session control function I-CSCF 600 for processing SIP signaling packets, multiple home subscriber servers 602 for storing subscription-related information, and a subscriber location function (SLF 604) for mapping a user address to one of the home subscriber servers 602. In one embodiment, the prepaid account balance screening function is integrated with the SLF database 606. In alternate embodiments of the present invention, the prepaid account balance screening function may be integrated with/co-located with a CSCF entity (e.g., I-CSCF, proxy-CSCF, serving-CSCF).

In FIG. 6, I-CSCF 600 receives a SIP INVITE message (FIG. 6, message 1) containing information identifying the parties to the SIP session: fred@aol.com and ed@vzw.com. I-CSCF 600 queries SLF 604 (FIG. 6, message 2). SLF 604 examines the called/calling party subscriber information contained in the SLF query message and identifies a prepaid subscriber, ed@vzw.com (FIG. 3, block 300). SLF 604 determines whether the prepaid subscriber's account balance satisfies a threshold requirement by querying SLF database 606, which contains prepaid account balance screening data (FIG.

3, block 302), and using data stored in the PREPAID_THRESHOLD field of SLF database 606 to perform prepaid screening. If the subscriber fails screening, then SLF 604 returns a prepaid screening failure indicator in the SLF response message (FIG. 6, message 3). I-CSCF 600 examines the prepaid screening failure indicator in the SLF response message (FIG. 3, block 304) and if it finds "not allowed" I-CSCF 600 will return a negative acknowledge message (e.g., 401, 403, etc.) to the call originator or an "upstream node" (FIG. 6, message 4) on behalf of the home subscriber servers 602 (FIG. 3, option 1, block 308).

In this manner, the prepaid screening-enabled SLF 604 is adapted to effectively shield home subscriber servers 602 from unnecessary query traffic associated with the prepaid subscriber's account. If the subscriber passes screening, then SLF processing and call routing continues normally.

In embodiments where the prepaid account balance screening function is integrated with/co-located with a CSCF entity, such as a proxy-CSCF, the screening function effectively shields multiple IMS core network elements/resources from unnecessary signaling traffic via early rejection of call attempts to/from subscribers with insufficient prepaid balances.

The subject matter described herein is not limited to the messages described above, but may be applied to any situation where a query to a prepaid subscriber database will determine which subscribers will or will not have access to the network and/or to some or all of the network services.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for performing prepaid account balance screening, the method comprising:
   at a network entity for processing network signaling messages:
   receiving a signaling message containing information that identifies a prepaid subscriber, the message being sent from a message source and intended for a message destination;
   determining, using prepaid account balance screening data and the information in the signaling message that identifies the prepaid subscriber, whether the prepaid subscriber's account balance satisfies a threshold requirement, wherein the available prepaid subscriber account information is stored in a prepaid subscriber database and wherein the prepaid account balance screening data is a subset of the available prepaid subscriber account information and is stored separate from the prepaid subscriber database; and
   in response to determining that the prepaid subscriber's account balance does not satisfy the threshold requirement, performing a screening action that shields the prepaid subscriber database from message traffic associated with the prepaid subscriber's account, wherein performing the screening action includes discarding the message.

2. The method of claim 1 wherein the network entity comprises one of a signal transfer point (STP), a signaling system seven/Internet protocol (SS7/IP) signaling gateway, a session initiation protocol (SIP) server, a media gateway controller (MGC), a softswitch (SS), a tandem office, and an Internet protocol multimedia system (IMS) node.

3. The method of claim 1 wherein the message received uses a message protocol comprising one of a signaling system seven (SS7) protocol, an Internet engineering task force (IETF) signaling transport (SIGTRAN) protocol, a session initiation protocol (SIP), a bearer independent call control (BICC) protocol, a Radius protocol, a Diameter protocol, and a mobile application part (MAP) protocol.

4. The method of claim 1 wherein receiving a message includes receiving a message sent one of route on global title and route on point code/subsystem number.

5. The method of claim 1 wherein the information that identifies the prepaid subscriber includes at least one of a communications service subscriber identifier and a uniform resource identifier.

6. The method of claim 1 wherein determining whether the prepaid subscriber's account balance satisfies a threshold requirement includes performing a lookup in a prepaid account balance screening database separate from the prepaid subscriber database.

7. The method of claim 1 wherein determining whether the prepaid subscriber's account balance satisfies a threshold requirement includes determining whether the prepaid subscriber's account balance is a value that is greater than zero.

8. The method of claim 1 wherein performing the screening action includes responding to the message source on behalf of the message destination.

9. The method of claim 8 wherein the message destination comprises the prepaid subscriber database.

10. The method of claim 8 wherein the message destination comprises a service control point (SCP) for processing queries to the prepaid subscriber database.

11. The method of claim 1 wherein performing the screening action includes modifying the message and forwarding the modified message to the message destination.

12. The method of claim 11 wherein modifying the received message includes removing from the received message information that identifies a prepaid subscriber that has an account balance that does not satisfy the threshold requirement.

13. The method of claim 1 wherein the received message comprises a query from a query source to a prepaid service application.

14. The method of claim 1 wherein the received message comprises a query from a query source to a mobile services node.

15. The method of claim 14 wherein the mobile services node comprises a home location register (HLR).

16. The method of claim 14 wherein the mobile service node comprises a home subscriber server (HSS).

17. The method of claim 1 wherein the received message comprises a messaging service message.

18. The method of claim 1 wherein the received message comprises a response message from a network service.

19. The method of claim 18 wherein the network service comprises an E.164 number mapping (ENUM) function.

20. The method of claim 18 wherein the network service comprises a domain name system (DNS) function.

21. The method of claim 1 wherein the received message comprises a query to a subscriber location function (SLF).

22. The method of claim 1 wherein performing the screening action includes shielding the prepaid subscriber database from signaling message traffic associated with the prepaid subscriber's account.

23. A system for performing prepaid account balance screening, the system comprising:
   a prepaid subscriber account balance screening database, containing prepaid account balance screening data representing a subset of available prepaid subscriber account information stored in a prepaid subscriber database separate from the prepaid account balance screening data; and a prepaid subscriber account balance screening function for receiving a signaling message containing information that identifies a prepaid subscriber, using the information in the signaling message that identifies the prepaid subscriber to extract information from the prepaid subscriber account balance screening database to determine whether the prepaid subscriber's account balance satisfies a threshold requirement, and in response to determining that the prepaid subscriber's account balance does not satisfy the threshold requirement, performing a screening action that shields the prepaid subscriber database from message traffic associated with the prepaid subscriber's account, wherein performing the screening action includes discarding the message.

24. The system of claim 23 wherein the network entity comprises one of a signal transfer point (STP), a signaling system seven/Internet protocol (SS7/IP) signaling gateway, a session initiation protocol (SIP) server, a media gateway controller (MGC), a softswitch (SS), a tandem office, and an Internet protocol multimedia system (IMS) node.

25. The system of claim 23 wherein the message received uses a message protocol comprising one of a signaling system seven (SS7) protocol, an Internet engineering task force (IETF) signaling transport (SIGTRAN) protocol, a session initiation protocol (SIP), a bearer independent call control (BICC) protocol, a Radius protocol, a Diameter protocol, and a mobile application part (MAP) protocol.

26. The system of claim 23 wherein the message received includes a message sent one of route on global title and route on point code/subsystem number.

27. The system of claim 23 wherein the information that identifies the prepaid subscriber includes at least one of a communications service subscriber identifier and a uniform resource identifier.

28. The system of claim 23 wherein the network entity is adapted to determine whether the prepaid subscriber's account balance satisfies a threshold requirement by performing a lookup in the prepaid subscriber account balance screening database.

29. The system of claim 23 wherein the network entity is adapted to determine whether the prepaid subscriber's account balance satisfies a threshold requirement by determining whether the prepaid subscriber's account balance is a value that is greater than zero.

30. The system of claim 23 wherein performing an action that shields the prepaid subscriber database from message traffic associated with the prepaid subscriber's account includes responding to the message source on behalf of the message destination.

31. The system of claim 30 wherein the message destination comprises the prepaid subscriber database.

32. The system of claim 30 wherein the message destination comprises a service control point (SCP) for processing queries to the prepaid subscriber database.

33. The system of claim 23 wherein performing the screening action includes modifying the message and forwarding the modified message to the message destination.

34. The system of claim 33 wherein modifying the message includes removing from the message information that identifies a prepaid subscriber that has an account balance that does not satisfy the threshold requirement.

35. The system of claim 23 wherein the message comprises a query from a query source to a prepaid service application.

36. The system of claim 23 wherein the message comprises a query from a query source to a mobile services node.

37. The system of claim 36 wherein the mobile services node comprises a home location register (HLR) function.

38. The system of claim 36 wherein the mobile services node comprises a home subscriber server (HSS) function.

39. The system of claim 23 wherein the message comprises a messaging service message.

40. The system of claim 23 wherein the message comprises a response message from a network service.

41. The system of claim 40 wherein the network service comprises an E.164 number mapping (ENUM) function.

42. The system of claim 40 wherein the network service comprises a domain name system (DNS) function.

43. The system of claim 23 wherein the message comprises a query to a subscriber location function (SLF).

44. A computer program product comprising computer executable instructions embodied in a non-transitory computer readable medium for performing prepaid account balance screening, the steps comprising:

receiving a signaling message containing information that identifies a prepaid subscriber, the message being sent from a message source and intended for a message destination;

determining, using prepaid account balance screening data and the information in the signaling message that identifies the prepaid subscriber, whether the prepaid subscriber's account balance satisfies a threshold requirement, wherein the available prepaid subscriber account information is stored in a prepaid subscriber database and wherein the prepaid account balance screening data is a subset of the available prepaid subscriber account information and is stored separate from the prepaid subscriber database; and in response to determining that the prepaid subscriber's account balance does not satisfy the threshold requirement, performing a screening action that shields the prepaid subscriber database from message traffic associated with the prepaid subscriber's account, wherein performing the screening action includes discarding the message.

* * * * *